Oct. 26, 1965   B. GOTTFURCHT ETAL   3,213,932
VARIED TEMPERATURE CONTAINER

Filed Sept. 14, 1961   2 Sheets-Sheet 1

INVENTORS
BERNARD GOTTFURCHT
MORRIS WEITZNER
BY
ATTORNEY

Oct. 26, 1965

B. GOTTFURCHT ETAL 3,213,932

VARIED TEMPERATURE CONTAINER

Filed Sept. 14, 1961

INVENTORS
BERNARD GOTTFURCHT
MORRIS WEITZNER
BY
ATTORNEY

United States Patent Office 3,213,932
Patented Oct. 26, 1965

3,213,932
VARIED TEMPERATURE CONTAINER
Bernard Gottfurcht, 130—06 68th Drive, and Morris
Weitzner, 72—02 Main St., both of Flushing, N.Y.
Filed Sept. 14, 1961, Ser. No. 138,081
5 Claims. (Cl. 165—61)

This invention relates to the art of self-heating or cooling containers.

According to the invention there is provided a closed container having a first compartment in which may be sealed a quantity of a beverage, or some food in solid or semi-solid form. The container includes a second compartment in which is a quantity of a granulated material capable of releasing heat or absorbing heat to effect chilling of the contents of the first compartment. In the second compartment is a sealed bag containing water or other fluid chemical capable of reacting with the granulated material for heating or chilling the reacting components, and thereby heating or chilling the contents of the first compartment. In order to puncture the bag containing the liquid reagent, there is provided a manually operable fork having tines adapted to pierce the wall of the bag and release the liquid reagent therefrom. The fork may have a threaded shank or shaft portion adapted to turn the fork when the shaft is moved axially at one end or side of the container. This effects a more rapid mixing of the granulated chemical and liquid reagent. The tines of the fork may also be twisted or threaded to form a large hole when the bag is punctured. The handle or head of the fork may be recessed inside the side or end of the container so that it cannot be actuated accidentally.

It is therefore one object of the invention to provide a self-heating or self-chilling container including partitions defining two compartments, one of the compartments being adapted to contain some substance to be heated or chilled and the other compartment containing a quantity of a granulated salt or other chemical and a quantity of water or other liquid reagent separated by a frangible wall, with a fork for puncturing the frangible wall to cause mixing of the dry chemical and liquid reagent and to produce a heating or chilling of the contents of the first compartment.

A further object is to provide a container as described, wherein the fork has a head recessed in a wall of the container and adapted to be pulled or pushed, the tines at the end of the fork in the second compartment being twisted to open large holes in the punctured wall.

Another object is to provide a fork structure for piercing a frangible wall separating granulated and liquid chemical reagents in a container as described, the fork having a twisted shaft and twisted tines.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
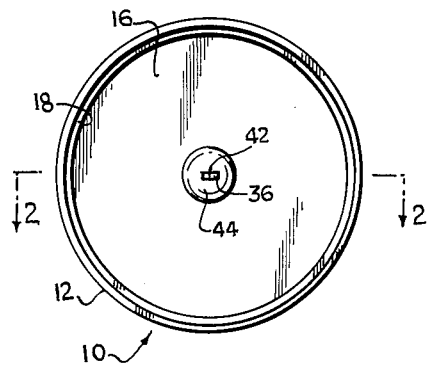
FIG. 1 is a bottom plan view of a container embodying the invention.
Figure 2:
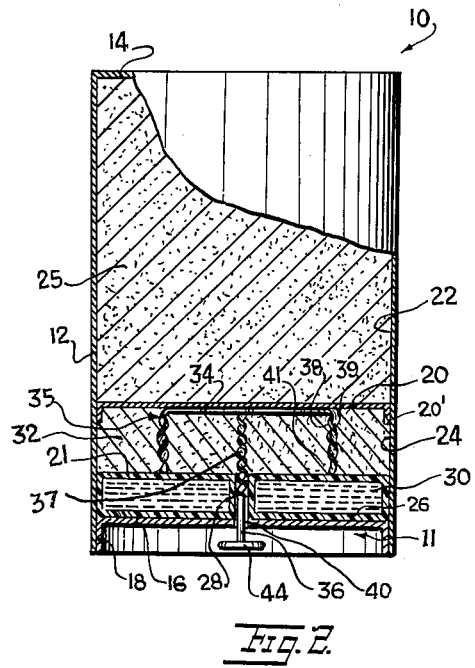
FIG. 2 is a sectional view of the container taken on line 2—2 of FIG. 1, part of the container being shown in elevation.
Figure 4:
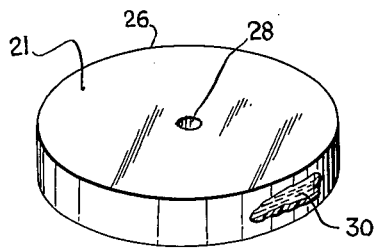
FIG. 4 is a perspective view of a sealed plastic bag containing a liquid reagent, employed in the container of FIGS. 1 and 2, part of the bag being broken away.

In FIGS. 1 and 2 is shown a container 10 having a cylindrical body wall 12 with flat end wall 14. In the open other end of the cylindrical body is a circular end wall 16 having a cylindrical skirt 18 secured to the cylindrical body to close the container. Inside the container is a circular partition 20 extending across the body 12 to define a first compartment 22 between partition 20 and end wall 14 and a second compartment 24 between partition 20 and end wall 16. The partition 20 may have a cylindrical flange 20' welded to the inside of the cylindrical body. A quantity of solid or semi-solid food 25 or a beverage fills the first compartment.

Figure 3:
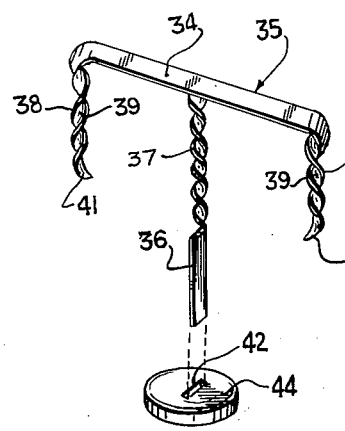
FIG. 3 is an exploded perspective view of a fork employed in the container of FIGS. 1 and 2.

In the second compartment 24 adjacent end wall 16 is a flat, cylindrical bag 26, shown to best advantage in FIGS. 2 and 3. This bag has a central or axial passage 28 formed therethrough. The bag contains water 30 or other liquid reagent. In the space between bag 26 and partition 20 is a quantity of granulated chemical 32. If this chemical is intended to make the container self-heating, the chemical 32 may be slaked lime. If the chemical is intended to make the container self-chilling the chemical may be a salt such as calcium chloride, sodium nitrite or the like. In order to pierce the frangible wall 21 of bag 26 there is provided a fork 35. This fork has a flat shaft or shank 36 which serves as a plunger. The shaft 36 is made of a flat strip of metal or plastic. It extends through a rectangular hole 40 in the end wall 16. The outer end of the shaft seats in a rectangular hole 42 formed in a button head or handle 44; see FIGS. 1–3. The flat shaft 36 passes axially through the hole 40 and passage 28 and through the body of granulated chemical material 32 and terminates in a flat crossbar 34. The crossbar has its ends bent parallel to the shaft 36 and formed with tines 38 twisted at 39 and terminating in sharp end points 41. The button head is located inside the recess 11 defined between the plane of the end of body wall 12 and the end wall 16. The crossbar abuts the partition 20. An inner end portion 37 of the shaft 36 may be twisted adjacent the crossbar as clearly shown in FIGS. 2 and 3.

In operation of this assembly, the button head will be pulled outwardly of the end of the container. The shaft 36 will move axially through hole 40 and the pointed ends of the tines 38 will pierce the frangible wall 21 of the bag 26. The bag is preferably made of a plastic material such as polyethylene or the like which effectively contains and retains the liquid but which tears readily when punctured. As the fork 35 is pulled outwardly the twisted portions 39 of the tines enter the holes punctured in the wall 21 and enlarge them so that the liquid mixes with the granulated chemical and reacts therewith to produce a heating or chilling effect which is conducted via partition 20 to the contents 25 of compartment 22. As the fork 35 is pulled further outwardly, the twisted portion 37 of the shaft 36 encounters hole 40 and the fork turns in compartment 24 while the container body 12 is manually grasped to resist turning. This causes the liquid 30 to mix more thoroughly with the granulated chemical 32. If the button handle or head is reciprocated so that shaft 36 moves axially in and out of the hole 40, the twisted portion 37 will cause the shaft to turn in one direction and then the opposite direction. The fork thus serves to stir the contents of compartment 24, and a quicker heating or cooling of the container 10 results.

Figure 5:
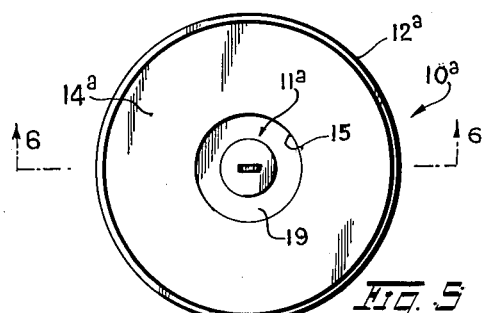
FIG. 5 is a top plan view of another container according to the invention.
Figure 6:
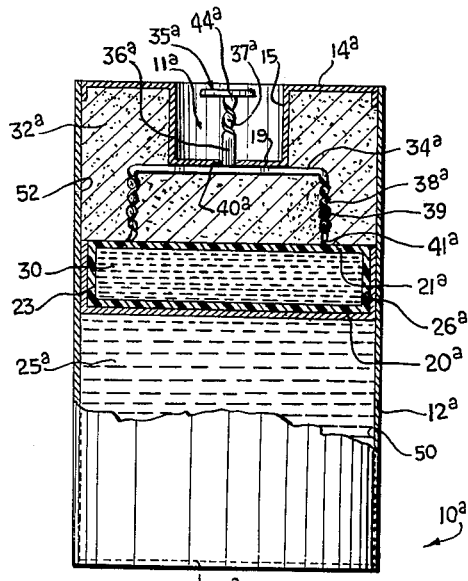
FIG. 6 is a sectional view taken on line 6—6 of FIG. 5, part of the container being shown in elevation.
Figure 7:
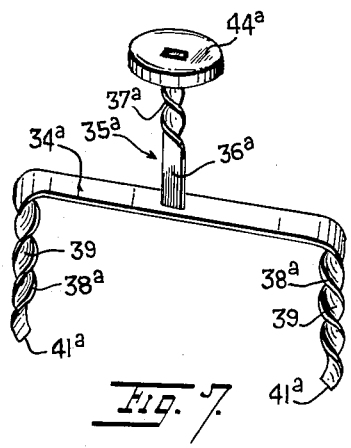
FIG. 7 is a perspective view of the fork employed in the container of FIGS. 5 and 6.

FIGS. 5–7 illustrate another embodiment of the invention. Container $10^a$ has a recess $11^a$ formed in end wall $14^a$ by a reentrant cylindrical portion 15. This portion has a flat inner end wall 19 provided with a rectangular hole $40^a$. The flat shaft $36^a$ of fork $35^a$ passes through hole $40^a$. Crossbar $34^a$ is secured to inner end of the shaft and is formed with twisted tines $38^a$ having pointed ends $41^a$ bearing on end wall $21^a$ of a flat, cylindrical plastic bag $26^a$. The bag contains water 30 or other liquid chemical reagent. A partition $20^a$ has a cylindrical flange 23 secured to the inner side of the cylindrical wall $12^a$ of the container. A first compartment 50 is defined between partition $20^a$ and end wall $16^a$ of the container. This compartment contains a beverage $25a$ or food in solid or semi-solid form. A second compartment 52 is defined between partition $20^a$ and end wall $14^a$. A granulated or powdered chemical $32^a$ fills the space in compartment 52 between the bag $26^a$ and end wall $14^a$. Shaft $36^a$ has a twisted portion $37^a$ just below button head $44^a$ of the fork; see FIGS. 6 and 7.

The assembly of FIGS. 5 and 6 is operated by pushing the fork inwardly so that points $41^a$ puncture the frangible wall $21^a$. Further pushing inwardly of the container causes the twisted portions 39 of the tines to enlarge the holes in wall $21^a$. Still further inward pushing of the fork causes the twisted portion $37^a$ of the shaft $36^a$ to encounter hole 40 and the fork turns while the container is held manually so that effective mixing of the liquid $25^a$ and granulated material 32 occurs.

Figure 8:
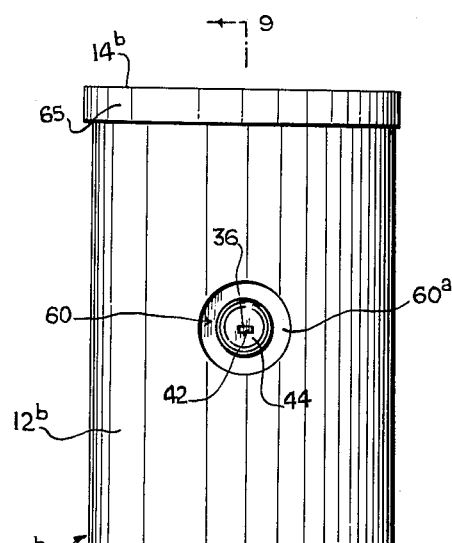
FIG. 8 is a side elevational view of another container according to the invention.
Figure 9:
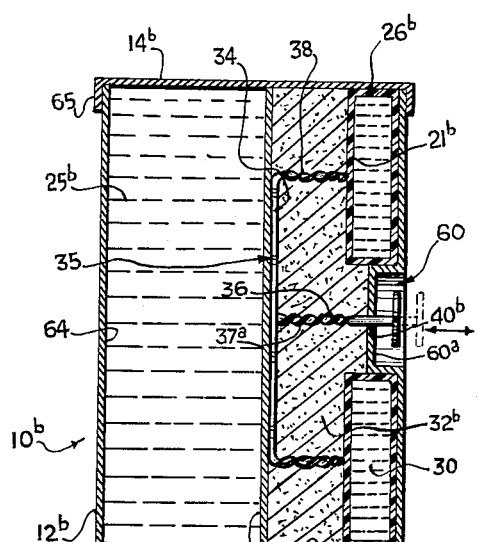
FIG. 9 is a sectional view taken on line 9—9 of FIG. 8.

In FIGS. 8 and 9, the assembly is similar to that of container 10 and corresponding parts are identically numbered. The container $10^b$ differs in that a cylindrical recess 60 is formed in the side wall of cylindrical body $12^b$. Head 44 can be grasped and pulled outwardly to cause tines 38 to pierce the frangible wall $21^b$ of cylindrical bag $26^b$. A rectangular partition 62 extends longitudinally of the container dividing it into food compartment 64 and heating or cooling compartment 66. Granulated material $32^b$ occupies the space between wall $21^b$ and partition 62. Food or beverage $25^b$ fills compartment 64. The container has an end wall $14^b$ with a flange 65 secured to the upper end of the container body $12^b$. The circular inside wall $60^a$ of recess 60 has a rectangular hole $40^b$ for guiding flat shaft 36 and for turning the fork 35 when the twisted part $37^a$ of the shaft encounters the hole $40^b$.

Figure 10:
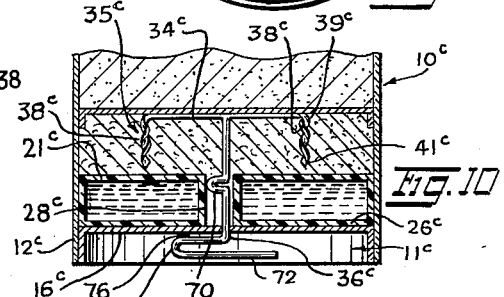
FIG. 10 is a fragmentary view similar to FIG. 2 of a container embodying a further modification of the invention.

Referring now to FIG. 10, the modified form of container $10^c$ shown herein differs merely in the construction of the cylindrical bag $26^c$ and the piercing fork $35^c$. In this form, the bag $26^c$ is formed with an axial passage $28^c$ of wider diameter.

The piercing fork $35^c$ has an elongated shank or shaft constituted by a narrow flat bar $36^c$. At the center of the length thereof, the bar is formed with a laterally extending loop 70 serving as a stop. The bar has no twisted portion. At one end, the bar $36^c$ is joined to a flat crossbar $34^c$ at the center of the length thereof. The crossbar has its ends bent parallel to the bar $36^c$ and is formed with tines $38^c$ twisted at $39^c$ and terminating in sharp end points $41^c$. The crossbar abuts the partition $20^c$.

At its other end, the bar $36^c$ terminates in a lateral flat loop $44^c$ extending to one side thereof and terminating in an extension 72 on the other side of the bar, the loop and extension serving as a handle. The handle is located inside the recess $11^c$ defined the plane of the end of the body wall $12^c$ and the end wall $16^c$.

In order to prevent accidental sliding or turning movement of the piercing fork $35^c$, the loop $44^c$ is spot welded to the end wall $16^c$ as indicated at 76. The weld spot is easily broken by manual downward pressure on the handle after which the fork can be pulled downwardly so that its tines pierce the wall $21^c$ of the bag $26^c$, whereby the liquid mixes with the granulated chemical producing heat or chilling effect. Downward movement of the fork is limited by the lateral loop 70 on the shank thereof. As the fork is pulled farther outwardly, the fork can be turned manually in compartment $24^c$ by means of the handle $44^c$ while the container body $12^c$ is manually grasped to resist turning, causing the liquid to mix more thoroughly with the granulated chemical.

The invention also contemplates a container having two or more liquid bags 26, which bags are to be disposed in the path of movement of the tines of the piercing fork $35^c$ so that they will become penetrated and punctured.

The invention makes it possible to provide a self-heating or self-cooling container which is readily activated by pushing or pulling a button handle or head. The reciprocation of the head causes a stirring of the contents of the chemical containing compartment after the bag containing the liquid reagent is punctured.

While we have illustrated and described the preferred embodiments of our invention, it is to be understood that we do not limit ourselves to the precise constructions herein disclosed and that various changes and modifications may be made within the scope of the invention as defined in the appended claims.

Having thus described our invention, what we claim as new, and desire to secure by United States Letters Patent is:

1. A varied temperature container, comprising a cylindrical body having end walls, one compartment serving to contain a quantity of a substance to be changed in temperature in the container, a sealed plastic bag containing a liquid reagent located in another compartment adjacent to one of said end walls, a quantity of a granulated chemical adapted to react with said liquid in said other compartment and cause a change of temperature in the one compartment, and a fork having a shaft, a head at one end of the shaft, a crossbar at the other end of the shaft, and a plurality of tines at the ends of the crossbar extending parallel to said shaft, said shaft extending through said one end wall, said tines having pointed ends bearing on a frangible side of said bag for puncturing said side of the bag when the fork is moved axially of the shaft, said shaft having a twisted portion adapted to cause the shaft to turn in said one end wall when the shaft is moved axially for more effectively mixing said chemical and liquid reagent after the bag is punctured, said one end wall of the container being recessed within the plane of said one end of said body, said head being concealed within the recess at said one end of the body, said tines pointing in a direction away from said crossbar and away from said one end wall so that the bag is punctured when the shaft is pushed axially inward of said one end wall.

2. A varied temperature container, comprising a cylindrical body having end walls, a partition inside said container dividing the interior thereof into two compartments, a quantity of a substance to be changed in temperature in one of the compartments, a quantity of a chemical in the other compartment, a sealed plastic bag containing a liquid in the other compartment, said bag being frangible to release said liquid for reaction with said chemical when the bag is punctured, said liquid and chemical being adapted to react to effect a change of temperature of the substance in the one compartment, and a fork having a shaft and tines, said tines having pointed ends disposed adjacent to a side of said bag, said shaft extending from the other compartment outside of said body, whereby axial movement of said shaft causes said tines to puncture said side of the bag, one of said end walls having a rectangular hole therein, said shaft being a flat member extending through said hole, said shaft having a twisted portion so that the fork turns when the twisted portion of the shaft is moved axially in said hole, said tines extending in a direction toward said shaft so that the tines puncture said bag when the shaft is initially moved inwardly of the container.

3. A varied temperature container, comprising a cylindrical body having end walls, a partition inside said body defining two compartments between said partition and the respective walls, one of said compartments serving to contain a quantity of a substance to be changed in temperature in the container, a sealed plastic bag containing a liquid reagent located in the other compartment adjacent to one of said end walls, a quantity of a granulated chemical adapted to react with said liquid in said other compartment and cause a change of temperature in the one compartment located between said bag and said partition, and a fork having a shaft, a looped handle at one end of the shaft, a crossbar at the other end of the shaft and a plurality of tines at ends of the crossbar extending parallel to said shaft, said shaft extending through said one end wall, said tines having pointed ends bearing on a frangible side of said bag for puncturing said side of the bag when the fork is moved axially of the shaft, said handle adapted to turn the fork for more effective mixing said chemical and liquid reagent after the bag is punctured.

4. A varied temperature container, comprising a cylindrical body having end walls, a partition inside said body defining two compartments between said partition and the respective end walls, one of said compartments serving to contain a quantity of a substance to be changed in temperature in the container, a sealed plastic bag containing a liquid reagent located in the other compartment adjacent to one of said end walls, a quantity of a granulated chemical adapted to react with said liquid in said other compartment and cause a change of temperature in the one compartment located between said bag and said partition, and a fork having a shaft, a looped handle at one end of the shaft, a crossbar at the other end of the shaft and a plurality of tines at ends of the crossbar extending parallel to said shaft, said shaft extending through said one end wall, said tines having pointed ends bearing on a frangible side of said bag for puncturing said side of the bag when the fork is moved axially of the shaft, said handle adapted to turn the fork for more effectively mixing said chemical and liquid reagent after the bag is punctured, said looped handle normally spot welded to the end wall to prevent accidental movement of the fork.

5. A varied temperature container, comprising a cylindrical body having end walls, a partition inside said body defining two compartments between said partition and the respective end walls, one of said comprtaments serving to contain a quantity of a substance to be changed in temperature in the container, a sealed plastic bag containing a liquid reagent located in the other compartment adjacent to one of said end walls, a quantity of a granulated chemical adapted to react with said liquid in said other compartment and cause a change of temperature in the one compartment located between said bag and said partition, and a fork having a shaft, a looped handle at one end of the shaft, a crossbar at the other end of the shaft and a plurality of tines at ends of the crossbar extending parallel to said shaft, said shaft extending through said one end wall, said tines having pointed ends bearing on a frangible side of said bag for puncturing said side of the bag when the fork is moved axially of the shaft, said handle adapted to turn the fork for more effectively mixing said chemical and liquid reagent after the bag is punctured, said looped handle normally spot welded to the end wall to prevent accidental movement of the fork, said shank having a lateral loop midway its ends to limit outward downward movement of the fork.

References Cited by the Examiner

UNITED STATES PATENTS

| 1,897,723 | 2/33 | Free | 62—4 |
| 2,576,505 | 11/51 | Engle | 30—6.1 |
| 2,623,515 | 12/52 | Sukacev | 126—263 |
| 2,850,006 | 9/58 | Karpalo | 126—262 |

ROBERT A. O'LEARY, *Primary Examiner.*

EARLE J. DRUMMOND, CHARLES SUKALO,
*Examiners.*